US012676296B2

(12) United States Patent
Oshiro et al.

(10) Patent No.: US 12,676,296 B2
(45) Date of Patent: Jul. 7, 2026

(54) ORTHOGONAL ACCELERATION TIME-OF-FLIGHT MASS SPECTROMETER AND TUNING METHOD FOR THE SAME

(71) Applicant: SHIMADZU CORPORATION, Kyoto (JP)

(72) Inventors: Tomoyuki Oshiro, Kyoto (JP); Kosuke Uchiyama, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 413 days.

(21) Appl. No.: 18/130,978

(22) Filed: Apr. 5, 2023

(65) Prior Publication Data

US 2023/0352293 A1 Nov. 2, 2023

(30) Foreign Application Priority Data

Apr. 28, 2022 (JP) ................................ 2022-074176

(51) Int. Cl.
*H01J 49/40* (2006.01)
*H01J 49/00* (2006.01)

(52) U.S. Cl.
CPC ........ *H01J 49/401* (2013.01); *H01J 49/0031* (2013.01)

(58) Field of Classification Search
CPC ............... H01J 49/0027; H01J 49/0031; H01J 49/0036; H01J 49/0009; H01J 49/401
See application file for complete search history.

(56) References Cited

U.S. PATENT DOCUMENTS

2016/0225602 A1* 8/2016 Ristroph ............... H01J 49/009
2021/0111013 A1 4/2021 Quarmby et al.
2021/0210316 A1 7/2021 Oshiro
2022/0084802 A1* 3/2022 Gioioso .............. H01J 49/0045

FOREIGN PATENT DOCUMENTS

GB 2536870 A * 10/2016 .......... H01J 49/0009
JP 2018-120804 A 8/2018
WO 2004/030025 A1 4/2004
WO WO-2019229950 A1 * 12/2019 .......... G01N 27/623

OTHER PUBLICATIONS

Communication issued Sep. 2, 2025, in Japanese Application No. 2022-074176.

* cited by examiner

*Primary Examiner* — David E Smith
(74) *Attorney, Agent, or Firm* — Sughrue Mion, PLLC

(57) ABSTRACT

An orthogonal acceleration electrode (242) deflects the flight direction of ions incident from an ion source (201). A flight-path-defining electrode (244, 246, 247) defines a flight path of the deflected ions. An ion detection section (245) detects an ion after the flight of the ion through the flight path. A voltage application section (3) applies voltages to the orthogonal acceleration electrode and flight-path-defining electrode. A measurement control section (43) acquires mass spectrum data by conducting a measurement of a known ion generated from a predetermined amount of known sample, under a plurality of measurement conditions which differ from each other in the value of the voltage applied to the orthogonal acceleration electrode. A score-value calculation section (44) calculates a score value based on a predetermined calculation formula, using the intensity of a mass peak and the mass-resolving power in the mass spectrum data acquired under each of the measurement conditions.

8 Claims, 5 Drawing Sheets

ORTHOGONAL ACCELERATION TIME-OF-FLIGHT MASS SPECTROMETER AND TUNING METHOD FOR THE SAME

TECHNICAL FIELD

The present invention relates to an orthogonal acceleration time-of-flight mass spectrometer.

BACKGROUND ART

Mass spectrometers have been used for identifying unknown compounds contained in samples or determining the quantities of known compounds. In a mass spectrometer, for example, a liquid sample is electrically charged and sprayed, whereby various compounds contained in the liquid sample are ionized. The resulting ions are subsequently separated from each other according to their mass-to-charge ratios, and the intensity of the ions is measured for each mass-to-charge ratio. Based on the measurement data obtained in this manner, a mass spectrum is created by drawing a graph with the two axes representing the mass-to-charge ratio and the measured intensity of the ions. Unknown compounds are identified based on the mass-to-charge ratios of the mass peaks in the mass spectrum, while the quantities of known compounds are determined based on the intensities of the mass peaks.

A mass spectrometer includes an ionization unit, ion transport optical system, mass-separation unit, ion detection unit and other types of units. Each unit contains electrodes arranged so as to create an electric field for converging ions or for other purposes Immediately after the mass spectrometer has been set up, or before the measurement of a trace amount of target compound contained in a sample is initiated, a voltage-tuning task is performed for optimizing the voltages applied to the electrodes provided in the related units in the mass spectrometer. Patent Literature 1 describes a process for automatically tuning each of the voltages applied to those electrodes. In this auto-tuning process, a sample containing a predetermined amount of standard substance is introduced into the mass spectrometer. While the value of the voltage applied to one electrode is gradually varied, the intensity of a predetermined kind of known ion generated from the standard substance is measured. The value of the voltage to be applied to each related electrode is determined so as to maximize the measurement intensity (or to maximize the measurement sensitivity) for the ion.

For the mass separation of compounds in a sample with a high level of mass-resolving power, orthogonal acceleration time-of-flight mass spectrometers have been used. In an orthogonal acceleration time-of-flight mass spectrometer, a cluster of ions generated in the ion source are introduced into an orthogonal accelerator, which deflects the flight direction of the ions to the orthogonal direction as well as imparts an equal amount of kinetic energy to each ion to bring them into a specific flight path. The intensities of the ions are sequentially measured after their flight through the measurement flight path is completed. Although the ions supplied from the ion source to the orthogonal accelerator at one time are in the form of an ion cluster, the ions included in the ion cluster are spread to a certain extent when entering the orthogonal accelerator. Within the orthogonal accelerator, those ions are deflected in the orthogonal direction to their incident direction and begin to fly in the measurement flight space. Accordingly, a high level of mass-resolving power can be achieved without being affected by the spread of the ions within the cluster in the incident direction to the orthogonal accelerator. Patent Literatures 2 and 3 disclose a method for tuning the values of the voltages applied to the electrodes in this type of orthogonal acceleration time-of-flight mass spectrometer so as to maximize the detection intensity for the ions, or so as to maximize the mass-resolving power for the ions.

CITATION LIST

Patent Literature

Patent Literature 1: JP 2018-120804 A
Patent Literature 2: WO 2004/030025 A
Patent Literature 3: US 2021/0111013 A

SUMMARY OF INVENTION

Technical Problem

In the case of a mass spectrometer which employs a quadrupole electric field for the mass separation of ions, or an ion trap time-of-flight mass spectrometer in which ions captured within the ion trap are ejected into the flight space, tuning the values of the voltages applied to the electrodes so as to maximize the detection intensity for the ions simultaneously yields a high level of mass-resolving power. Conversely, tuning the values of the measurement parameters so as to maximize the mass-resolving power also simultaneously yields a high level of sensitivity. However, it has been found that this does not apply to orthogonal acceleration time-of-flight mass spectrometers; i.e., tuning the values of the measurement parameters so as to maximize the measurement sensitivity for the ions does not always mean an optimization in mass-resolving power, and tuning the values of the measurement parameters so as to maximize the mass-resolving power for the ions does not always mean an optimization in measurement sensitivity.

The problem to be solved by the present invention is to provide a technique by which both a high level of measurement sensitivity and a high level of mass-resolving power can be obtained in an orthogonal acceleration time-of-flight mass spectrometer.

Solution to Problem

A tuning method for an orthogonal acceleration time-of-flight mass spectrometer according to the present invention developed for solving the previously described problem includes the steps of:

generating a predetermined kind of known ion from a sample by an ion source;

deflecting the flight direction of ions incident from the ion source by applying a voltage to an orthogonal acceleration electrode, so as to cause the ions to fly in a flight path defined by a flight-path-defining electrode;

acquiring mass spectrum data by detecting ions separated from each other by mass while flying in the flight path; and calculating a score value based on a predetermined calculation formula, using the intensity of a mass peak of the known ion and the mass-resolving power in the mass spectrum data, where:

the score value is calculated for each of a plurality of measurement conditions which differ from each other in the value of the voltage applied to the orthogonal acceleration electrode; and the value of the voltage to be applied to the orthogonal acceleration electrode is determined based on the score value calculated for each of the plurality of measurement conditions.

An orthogonal acceleration time-of-flight mass spectrometer according to the present invention includes:

an ion source;

an orthogonal acceleration electrode configured to deflect the flight direction of ions incident from the ion source;

a flight-path-defining electrode configured to define a flight path of the ions deflected by the orthogonal acceleration electrode;

an ion detection section configured to detect an ion after the flight of the ion through the flight path is completed;

a voltage application section configured to apply a voltage to the orthogonal acceleration electrode and a voltage to the flight-path-defining electrode;

a measurement control section configured to acquire mass spectrum data by conducting a measurement of a predetermined kind of known ion generated from a predetermined amount of known sample, under a plurality of measurement conditions which differ from each other in the value of the voltage applied from the voltage application section to the orthogonal acceleration electrode; and a score-value calculation section configured to calculate a score value based on a predetermined calculation formula, using the intensity of a mass peak and the mass-resolving power in the mass spectrum data acquired under each of the plurality of measurement conditions.

Advantageous Effects of Invention

The orthogonal acceleration time-of-flight mass spectrometer according to the present invention includes: an ion source; an orthogonal acceleration electrode configured to deflect the flight direction of ions incident from the ion source; a flight-path-defining electrode configured to define a flight path of the ions deflected by the orthogonal acceleration electrode; and an ion detection section configured to detect an ion after the flight of the ion through the flight path is completed. The orthogonal acceleration electrode includes, for example, a push-out electrode located on the opposite side from the flight space across the central axis of the flight path of the ions incident from the ion source, and a pulling electrode located on the same side as the flight space. The flight-path-defining electrode includes, for example, a flight tube arranged on the peripheral area of the flight space. In the case of a reflectron mass spectrometer, for example, the reflectron and the back plate for forming the returning flight path of the ions are also included in the flight-path-defining electrode.

If the same amount of ions are generated in the ion source and completely detected in the ion detection section, the mass peak in the mass spectrum data will always have the same area, and the peak width of the mass peak will be narrowest when the mass peak is highest. That is to say, both the highest measurement intensity and the highest mass-resolving power will be obtained. However, in the orthogonal acceleration time-of-flight mass spectrometer, an unfavorable situation may possibly occur; for example, when the value of the voltage applied to the orthogonal acceleration electrode is changed in order to increase the mass-resolving power, some of the ions which have entered the orthogonal acceleration electrode will no longer be introduced into the flight space, causing a decrease in measurement intensity, or conversely, when a larger amount of ions is introduced into the flight space in order to increase the measurement intensity, the mass-resolving power will be lowered. Therefore, even when the same amount of ions are generated by the ion source, the amount of ions which ultimately reach the ion detector can significantly change depending on the value of the voltage applied to the orthogonal acceleration electrode. Accordingly, it is most likely that there have been cases in which an orthogonal acceleration time-of-flight mass spectrometer shows a low level of mass-resolving power when the values of the measurement parameters are optimized so as to maximize the measurement sensitivity for the ions, while the same device shows a low level of measurement sensitivity when the values of the measurement parameters are optimized so as to maximize the mass-resolving power for the ions.

According to the present invention, mass spectrum data are acquired by a measurement of a predetermined kind of known ion generated from a predetermined amount of known sample, under a plurality of measurement conditions which differ from each other in the value of the voltage applied to the orthogonal acceleration electrode. A score value is calculated based on a predetermined computation formula, using the intensity of a mass peak and the mass-resolving power in the mass spectrum data acquired under each of the plurality of measurement conditions. According to the present invention, since both the intensity of the known ion and the mass-resolving power are thus considered in the calculation of the score value, both a high level of measurement sensitivity and a high level of mass-resolving power can be achieved by using the calculated score value as a basis for determining the value of the voltage to be applied to the orthogonal acceleration electrode.

DESCRIPTION OF EMBODIMENTS

One embodiment of the orthogonal acceleration time-of-flight mass spectrometer according to the present invention, and the tuning method for this mass spectrometer, is hereinafter described with reference to the drawings.

Figure 1:
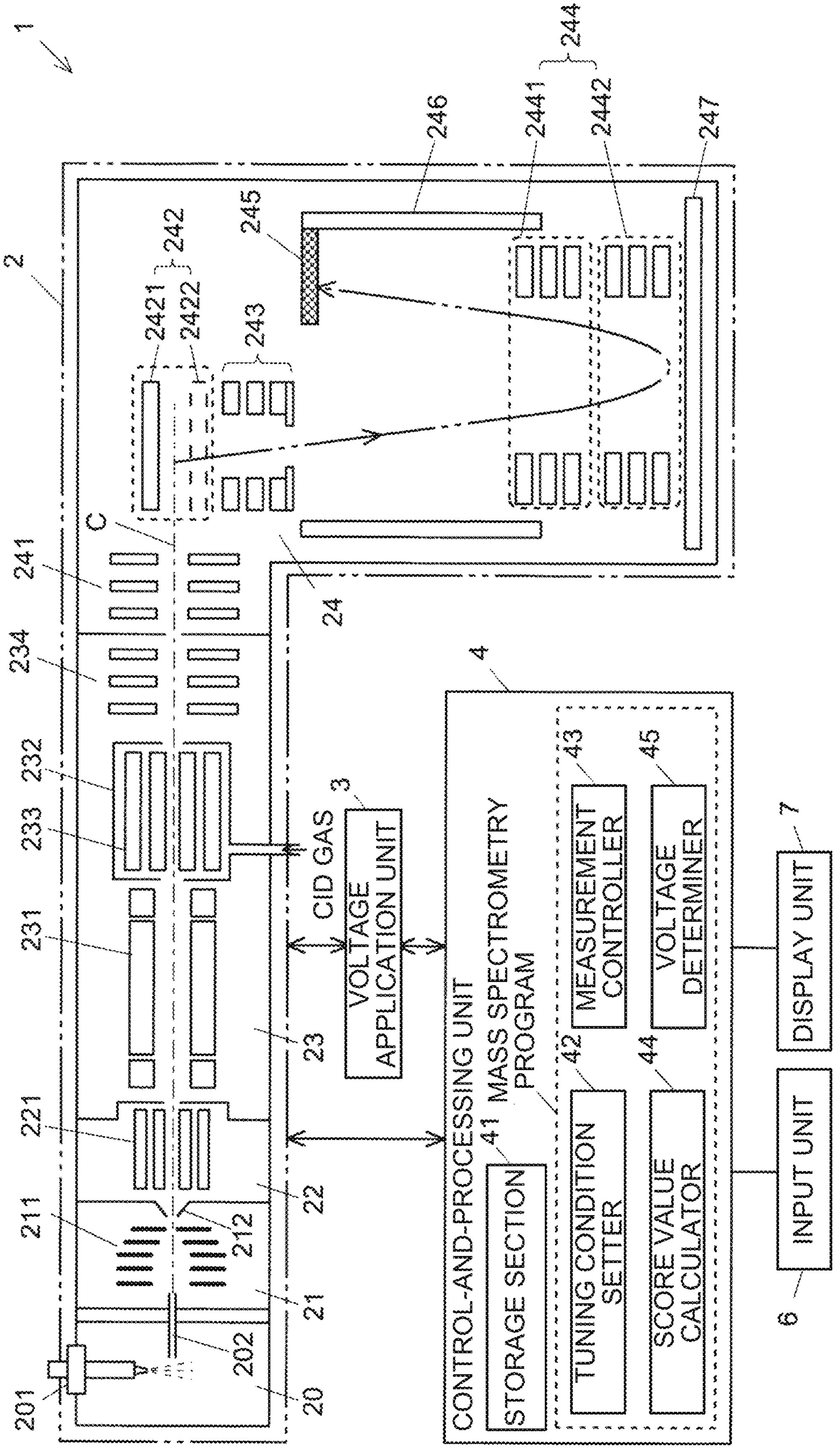
FIG. 1 is a diagram showing the configuration of the main components in one embodiment of the orthogonal acceleration time-of-flight mass spectrometer according to the present invention.

FIG. 1 shows a schematic configuration of the orthogonal acceleration time-of-flight mass spectrometer (OA-TOF-MS) 1 according to the present embodiment. The OA-TOF-MS 1 according to the present embodiment includes, as its major components, a mass spectrometry unit 2, a voltage application unit 3, and a control-and-processing unit 4 configured to control the previously mentioned units.

The mass spectrometry unit 2 has an ionization chamber 20 maintained at substantially atmospheric pressure as well as a vacuum chamber. The vacuum chamber internally has a first intermediate vacuum chamber 21, second intermediate vacuum chamber 22, third intermediate vacuum chamber 23 and analysis chamber 24 arranged in the mentioned order from the ionization chamber 20. Each of these chambers are evacuated with vacuum pumps (not shown) so as to configure a multi-stage differential pumping system in which the degree of vacuum gradually increases from the first intermediate vacuum chamber 21 toward the analysis chamber 24.

The ionization chamber 20 is provided with an electrospray ionization probe (ESI probe) 201 configured to electrically charge a liquid sample and spray it as charged droplets. The ionization chamber 20 communicates with the first intermediate vacuum chamber 21 through a desolvation tube 202 which is a thin capillary. A flow of a heated counter-current gas is continuously supplied from a gas source (not shown) toward the desolvation tube 202. The charged droplets sprayed from the ESI probe 201 undergo desolvation and are thereby ionized while travelling from the ionization chamber 20 through the desolvation tube 202 into the first intermediate vacuum chamber 21.

The first intermediate vacuum chamber 21 contains an ion guide 211 formed by a plurality of ring electrodes. The ions which have entered the first intermediate vacuum chamber 21 are converged by the ion guide 211 so that they fly along the ion beam axis C. The first intermediate vacuum chamber 21 is separated from the second intermediate vacuum chamber 22 by a skimmer 212 having a small hole at its apex. The ions converged by the ion guide 211 travel through the skimmer 212 into the second intermediate vacuum chamber 22.

The second intermediate vacuum chamber 22 contains an ion guide 221 formed by a plurality of rod electrodes. The ions which have entered the second intermediate vacuum chamber 22 are converged by the ion guide 221 so that they fly along the ion beam axis C. The second intermediate vacuum chamber 22 is separated from the third intermediate vacuum chamber 23 by a partition wall having an opening at the position of the ion beam axis C. The ions converged by the ion guide 221 travel through this opening into the third intermediate vacuum chamber 23.

The third intermediate vacuum chamber 23 contains a quadrupole mass filter 231 configured to separate ions according to their mass-to-charge ratios, a collision cell 232 with a multipole ion guide 233 provided inside, and an ion guide 234 formed by a plurality of ring electrodes. The collision cell 232 is internally supplied with a collision-induced dissociation (CID) gas, such as argon or nitrogen, from a gas source (not shown) as needed. For example, in an MS/MS analysis, an ion having a specific mass-to-charge ratio among the ions which have entered the third intermediate vacuum chamber 23 is selected by the quadrupole mass filter 231 as the precursor ion and allowed to enter the collision cell 232. Within the collision cell 232, the precursor ion collides with the CID gas, whereby product ions are generated. The product ions generated in the collision cell 232 are converged by the ion guide 234 so that they fly along the ion beam axis C and enter the analysis chamber 24.

The analysis chamber 24 contains an ion lens 241 formed by a plurality of ring electrodes, an orthogonal acceleration electrode 242 formed by a push-out electrode 2421 and a pulling electrode 2422, a second acceleration electrode 243, a reflectron 244, a flight tube 246, a back plate 247 and an ion detector 245. The push-out electrode 2421 is a plate electrode, while the pulling electrode 2422 is an electrode shaped like a plate in its entire form with an ion-passage portion formed at its center. The second acceleration electrode 243 has a plurality of ring-shaped electrodes and a slit located behind them. The reflectron 244 includes a first reflectron 2441 and a second reflectron 2442 each of which consists of a plurality of ring-shaped electrodes. The flight tube 246 is a tubular electrode. The back plate 247 is a plate-shaped electrode.

The ions which have entered the analysis chamber 24 are converged by the ion lens 241 along the ion beam axis C and subsequently enter the space between the push-out electrode 2421 and the pulling electrode 2422 (orthogonal acceleration space).

To the push-out electrode 2421, a pulse voltage is applied in a predetermined cycle of time. By the application of this pulse voltage, an electric field which deflects the flight direction of the ions to the orthogonal direction (i.e., in the direction from the push-out electrode 2421 toward the pulling electrode 2422) is created within the orthogonal acceleration space. After the flight direction has been deflected by the orthogonal acceleration electrode 242, the ions are given a predetermined amount of kinetic energy from the acceleration electric field created by the voltage applied to the second acceleration electrode 243 and begin to fly in the returning flight path defined by the reflectron 244, flight tube 246 and back plate 247, to ultimately arrive at the ion detector 245. Since an ion having a smaller mass-to-charge ratio flies at a higher speed, the ions are separated from each other according to their respective mass-to-charge ratios while flying in the flight path. Consequently, the ions arrive at the ion detector 245 and are thereby detected in ascending order of their mass-to-charge ratios.

The voltage application unit 3 applies a predetermined voltage to each electrode in the mass spectrometry unit 2 based on the control signals sent from the control-and-processing unit 4.

The control-and-processing unit 4 has a storage section 41 and also includes a tuning condition setter 42, measurement controller 43, score value calculator 44 and voltage determiner 45 as its functional blocks. The control-and-processing unit 4 is actually a personal computer, on which a program for mass spectrometry previously installed on the same computer is executed to cause the aforementioned functional blocks to operate. An input unit 6 including a keyboard, mouse and other devices, as well as a display unit 7 consisting of a liquid display or similar device, are connected to the control-and-processing unit 4.

The storage section 41 holds measurement conditions for various compounds (including the mass-to-charge ratios of the MRM transition which is the precursor ion and the product ion in an MRM measurement) as well as information (such as a formula or table) showing the relationship between the time of flight and the mass-to-charge ratio of the ions within the measurement flight space. It also holds the default value of the voltage to be applied to each electrode in the tuning process, and other pieces of information, including the step width (e.g., 1V) and scan range (e.g., ±50V) of a voltage scan as well as the intensity and mass-resolving power in the voltage scan.

The OA-TOF-MS 1 according to the present embodiment is characterized by the tuning of the values of the voltages applied to the electrodes arranged within the analysis chamber 24. In the case of a mass spectrometer which uses a quadrupole electric field for the mass separation of ions, or an ion trap time-of-flight mass spectrometer in which ions captured within the ion trap are ejected into the flight space, tuning the values of the voltages applied to the electrodes so as to maximize the detection intensity for the ions simultaneously yields a high level of mass-resolving power. Conversely, tuning the values of the measurement parameters so as to maximize the mass-resolving power also simultaneously yields a high level of sensitivity. However, in the case of orthogonal acceleration time-of-flight mass spectrometers, optimizing the values of the measurement parameters so as to maximize the measurement sensitivity for the ions does not always mean an optimization in mass-resolving power, and optimizing the values of the measurement parameters so as to maximize the mass-resolving power for the ions does not always mean an optimization in measurement sensitivity. This point will be hereinafter explained.

Figure 2:
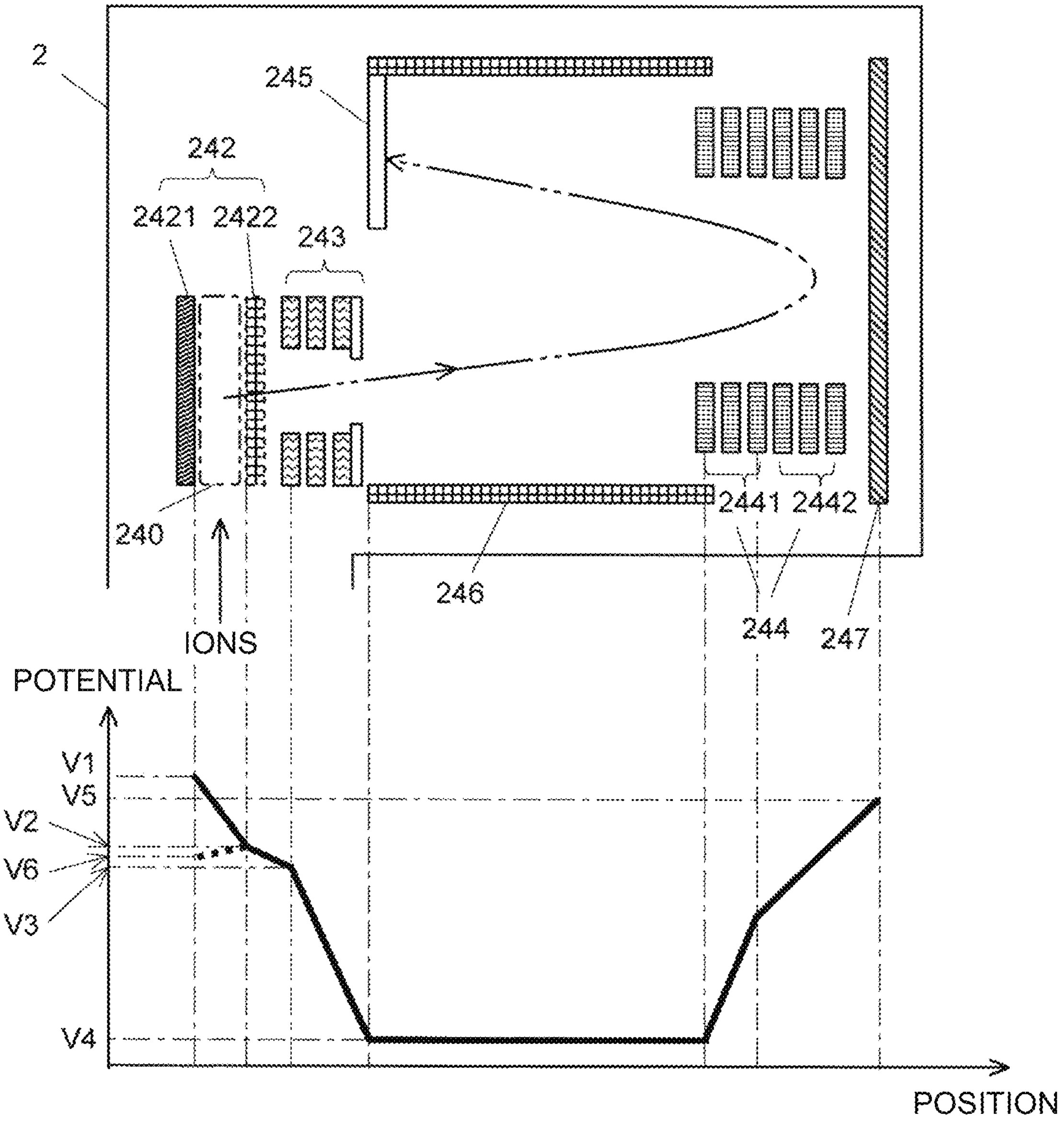
FIG. 2 is a diagram illustrating the potential of each of the electrodes arranged within an analysis chamber in the orthogonal acceleration time-of-flight mass spectrometer according to the present embodiment.

The voltages applied to the electrodes in the analysis chamber 24 of the OA-TOF-MS are initially described with reference to FIG. 2. The following description deals with an example in which ions behave in an ideal manner. The previously mentioned default values for the tuning process may be the values of the voltages which are applied when ions behave in an ideal manner. Alternatively, an engineer may enter specific values for each device as the default values. The following description deals with the voltages applied to the electrodes when the measurement target is a positive ion. When the measurement target is a negative ion, the values of the voltages applied to the electrodes should be specified in reverse order of magnitude.

The ions which have entered the analysis chamber 24 travel through the central holes of the plurality of lens electrodes forming the ion lens 241 (on the ion beam axis C) and enter the orthogonal acceleration space formed between the push-out electrode 2421 and the pulling electrode 2422. As modelled in FIGS. 1 and 2, all ions which have entered the orthogonal acceleration space arrive at a single point at the center of the orthogonal acceleration space at the point in time where the pulse voltage (which will be described later) is applied to the push-out electrode 2421.

Voltage V2 is always applied to the pulling electrode 2422, while a pulse voltage V1 (V1>V2) is applied in a predetermined cycle of time. A downward potential gradient is thereby formed from the push-out electrode 2421 toward the pulling electrode 2422, whereby the flight direction of the ions which have entered the orthogonal acceleration space is deflected to the orthogonal direction. During the "standby period", which is a period of time other than the period of time during which the pulse voltage is applied (which is hereinafter called the "acceleration period"), the same voltage V2 as applied to the pulling electrode 2422 is applied to the push-out electrode 2421, so that no potential gradient is formed between the two electrodes.

In the second acceleration electrode 243, volage V3 (V2>V3) is applied to the ring electrode closest to the pulling electrode 2422, with the other ring electrodes supplied with voltages which form a downward potential gradient toward the reflectron 244. The ions whose flight direction has been deflected by the orthogonal acceleration electrode 242 are thereby accelerated toward the flight space surrounded by the flight tube 246, reflectron 244 and back plate 247.

Voltage V4 (V3>V4) is applied to the flight tube 246. The first reflectron 2441 located on the side facing the flight space, the second reflectron 2442 located on the side facing the back plate 247, and the back plate 247 are supplied with voltages which form an upward potential gradient from the flight tube 246 toward the back plate 247. Voltage V5 (V5>V4) is applied to the back plate 247.

The ions introduced into the flight space by the second acceleration electrode 243 initially fly in the space surrounded by the flight tube 246 within which there is effectively no electric field (field-free space) and subsequently enter the space surrounded by the reflectron 244 (repelling flight space). Due to the upward potential gradient formed within the repelling flight space, the ions are gradually decelerated and reverse their flight direction to once more travel toward the field-free space. After flying through the field-free space, the ions arrive at the ion detector 245.

As in the previously described case, when all ions behave in an ideal manner, all ions which have arrived at the center of the orthogonal acceleration space will follow the same flight path and arrive at the ion detector 245. Ions having the same mass-to-charge ratio will take the same period of time to fly through that flight path, and simultaneously arrive at the ion detector 245. In practice, however, due to the Coulomb repulsion between the ions, those ions form a cluster having a spatial spread to a certain extent when they enter the orthogonal acceleration space. Furthermore, the individual ions slightly vary in terms of the velocity and direction of their flight. Additionally, the ion beam axis C may be slightly misaligned due to the assembly accuracy of the mass spectrometer.

In the case where the ions enter the orthogonal acceleration space in a spatially spread form, when the pulse voltage V1 is applied to the push-out electrode 2421 to create an electric field, an ion closer to the push-out electrode 2421 receives a larger amount of energy from the electric field before entering the second acceleration electrode 243. That is to say, the amount of energy given to an ion changes depending on the position of the ion at the point in time of the application of the pulse voltage V1, so that a variation occurs in the kinetic energy possessed by each ion after being accelerated by the second acceleration electrode 243. If the time-of-flight mass spectrometer had no reflectron 244 and allowed ions to fly linearly, the variation in the kinetic energy of the ions would directly lead to a variation in the time of flight, which would lower the mass-resolving power.

In the OA-TOF-MS 1 according to the present embodiment, the variation in the kinetic energy of the ions due to the spatial spread of the ions can be cancelled by appropriately setting the repelling electric field created by the reflectron 244. The ions which have been accelerated by the second acceleration electrode 243 fly through the field-free space surrounded by the flight tube 246 and enter the repelling flight space surrounded by the reflectron 244. Since the electrodes forming the reflectron 244 are supplied with voltages which form an upward potential gradient toward the back plate 247, the ions which have entered the repelling flight space gradually lose their kinetic energy and are subsequently accelerated in the opposite direction. An ion having a larger amount of kinetic energy at the point in time of entry into the repelling flight space travels deeper into the repelling flight space (closer to the back plate 247). That is to say, an ion having a larger amount of kinetic energy flies a longer distance. Accordingly, in the OA-TOF- MS 1, the difference in the kinetic energy of the ions can be compensated for by appropriately setting the voltages applied to the reflectron 244.

On the other hand, a variation in the flight direction and flight velocity possessed by the ions cannot be cancelled by the reflectron 244. When the pulse voltage V1 is applied to the push-out electrode 2421, an ion flying along the ion beam axis C as well as one flying toward the pulling electrode 2422 immediately begin to move toward the pulling electrode 2422. On the other hand, an ion flying toward the push-out electrode 2421 needs a certain period of time to change its flight direction toward the pulling electrode 2422. This period of time is called the "turnaround time". Thus, depending on the components of the flight velocity and flight direction of each ion, a difference occurs in terms of the period of time required for an ion to begin to fly toward the second acceleration electrode 243. This temporal difference cannot be cancelled throughout their travel to the ion detector 245, and therefore, causes a decrease in mass-resolving power.

Figure 3:
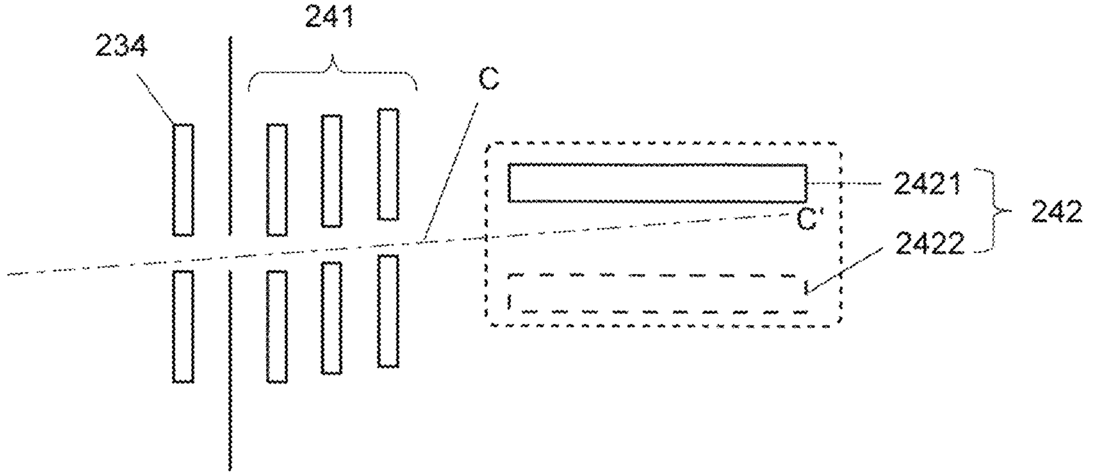
FIG. 3 is a diagram illustrating the flight path of an ion cluster in the case where the axis of an ion lens is misaligned.
Figure 4:
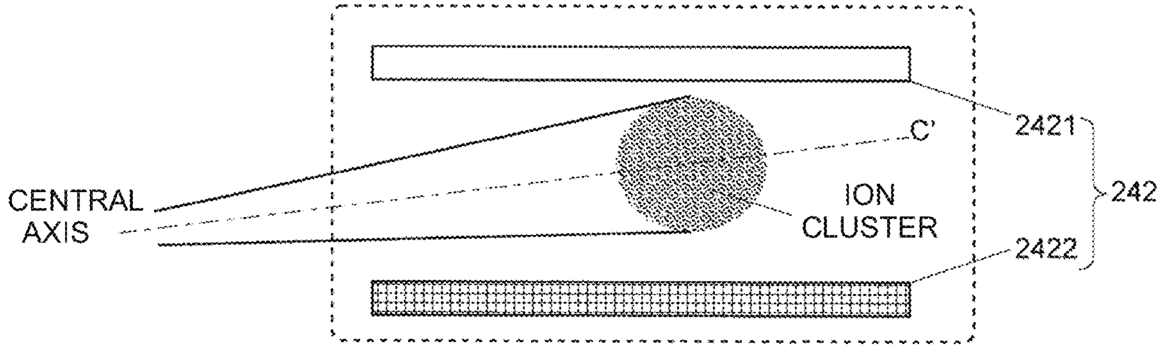
FIG. 4 is one example of the flight path of an ion cluster within an orthogonal acceleration space.

If there is a misalignment in the central position of the ring electrodes forming the ion lens 241, the ion cluster entering the orthogonal acceleration space will have a spatially spread form centered on an axis C' tilted from the ion beam axis C which corresponds to the assumed ideal arrangement of the electrodes. For example, as shown in FIG. 3, if the central position of the ring electrodes forming the ion lens 241 is gradually shifted toward the push-out electrode 2421 as the location among the ring electrodes comes closer to the rear side, the ion cluster entering the orthogonal acceleration space will have a spatially spread form centered on an axis C' tilted toward the push-out electrode 2421, as shown in FIG. 4. A considerable portion of the ions in this ion cluster will fly toward the push-out electrode 2421.

FIG. 4 shows the flight path which the ions follow until the point in time of the application of the pulse voltage V1 to the push-out electrode 2421 in the case where voltage V2 is applied to the push-out electrode 2421 during the standby period. Since this voltage V2 applied to the push-out electrode 2421 during the standby period is equal to the voltage V2 applied to the pulling electrode 2422, the orthogonal acceleration space is a field-free space. Therefore, until the pulse voltage V1 is applied to the push-out electrode 2421, the ions which have entered the orthogonal acceleration space through the ion lens 241 continue their flight, maintaining the flight direction and flight velocity which they had when they entered the orthogonal acceleration space. Consequently, the angular spread of the ion beam at the entry of the ions into the orthogonal acceleration space almost directly leads to a variation in the flight direction and flight velocity. This variation causes the turnaround time, which lowers the mass-resolving power.

Figure 5:
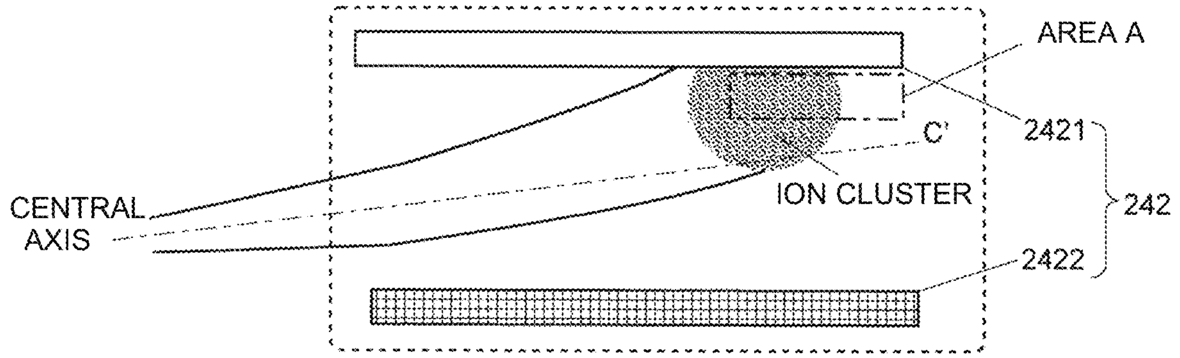
FIG. 5 is another example of the flight path of an ion cluster within an orthogonal acceleration space.

FIG. 5 shows the flight path which the ions follow until the point in time of the application of the pulse voltage V1 to the push-out electrode 2421 in the case where voltage V6 (V6<V2) is applied to the push-out electrode 2421 during the standby period. This voltage V6 applied to the push-out electrode 2421 during the standby period is lower than the voltage V2 applied to the pulling electrode 2422. Therefore, until the pulse voltage V1 is applied to the push-out electrode 2421, the ions which have entered the orthogonal acceleration space through the ion lens 241 are gradually attracted toward the push-out electrode 2421 during their flight. Consequently, some of the ions in the ion cluster collide with the push-out electrode 2421 and become lost. Meanwhile, however, the angular spread of the ions at the point in time of the application of the pulse voltage V1 to the push-out electrode 2421 becomes smaller than that of the ions at the entry into the orthogonal acceleration space. Consequently, the variation in the flight direction and flight velocity becomes smaller, so that the mass-resolving power becomes higher than in the case of FIG. 4, while the detection sensitivity for the ions becomes lower.

Thus, in the OA-TOF-MS 1, tuning the values of the voltages applied to the orthogonal acceleration electrode 242 (particularly, the push-out electrode 2421) does not always result in an optimization of both the sensitivity and mass-resolving power for the ions under the same condition, due to the positional relationship of the related elements in the device or the behavior of the ions. The previously described cases referring to FIGS. 4 and 5 are mere examples. A similar situation can occur due to other factors, such as the ion beam axis C' being tilted toward the pulling electrode 2422. Although the previous description was concerned with a situation caused by the voltage applied to the push-out electrode 2421 during the standby period, the behavior of the ions can also be changed due to the magnitude of the potential gradient formed by the voltage applied to the push-out electrode 2421 and the voltage applied to the pulling electrode 2422 during the acceleration period.

A similar situation can also occur in the second acceleration electrode 243; tuning the values of the voltages applied to the second acceleration electrode 243 does not always result in an optimization of both the sensitivity and mass-resolving power for the ions. This point will be hereinafter explained.

For example, if the potential formed by the second acceleration electrode 243 is deviated toward the higher-potential side from the potential gradient connecting the potential of the pulling electrode 2422 and that of the flight tube 246, the ions flying through the space surrounded by the second acceleration electrode 243 ("second acceleration space") are more likely to be spread. This phenomenon is called the "lens effect". Under the lens effect, the ions are more likely to be lost due to the collision with the lens electrodes forming the second acceleration electrode 243, or with a slit at the exit end of the second acceleration space, before they reach the exit of the second acceleration space. Accordingly, preventing the lens effect yields a higher level of ion detection sensitivity.

There is also a slight variation in the timing of the entry of the individual ions into the orthogonal acceleration space among one cluster of ions whose flight direction is changed by the application of a single pulse voltage. An ion which has entered the orthogonal acceleration space earlier travels deeper into the orthogonal acceleration space along the central axis C'. In this situation, for example, if voltage V6 (V6<V2) is applied during the standby period as shown in FIG. 5 in order to give priority to the mass-resolving power rather than the ion detection sensitivity, an ion which has entered the orthogonal acceleration space earlier travels in the orthogonal acceleration space for a longer period of time. Consequently, the ion travels deeper into the orthogonal acceleration space while being attracted closer to the push-out electrode 2421. Ions of this type are located in the upper right area "A" of the orthogonal acceleration space in FIG. 5, and also has a significant velocity component in the opposite direction to the direction of the orthogonal acceleration. These ions have a long turnaround time in the orthogonal acceleration phase, and therefore, will lower the mass-resolving power if they arrive at the ion detector 245 and are thereby detected.

An ion which has traveled deeper into the orthogonal acceleration space comes to a closer position to the ion detector 245 within the second acceleration space. Therefore, if the lens effect is intentionally produced within the second acceleration space by the voltages applied to the second acceleration electrode 243, the ion will be more likely to collide with the lens electrodes or the slit forming the second acceleration electrode 243. Accordingly, when the lens effect is intentionally produced within the second acceleration electrode 243, ions having a long turnaround time will be lost, and the mass-resolving power will be higher.

In the present embodiment, the facts described thus far are taken into account for the tuning. The procedure of the tuning task is hereinafter described.

A user issues a command to initiate the tuning task. The tuning condition setter 42 displays, on the screen of the display unit 7, a screen for allowing the user to input the tuning conditions. This screen allows the user to set weighting factors to be used in the calculation of the score value (which will be described later) for weighting a value determined from the ion detection sensitivity and a value determined from the mass-resolving power. The user inputs a value of X which is greater than 0 and smaller than 1 as the weighting factor for the ion detection sensitivity. Then, 1−X is automatically set as the weighting factor for the mass-resolving power. With those values thus set, the following formula (1) for calculating a score value Z is created and saved in the storage section 41:

$$Z=X*I+(I-X)*R \tag{1}$$

where I is a normalized value of the intensity of the mass peak of an ion originating from a standard substance having a predetermined mass-to-charge ratio, and R is a normalized value of the mass-resolving power. As a matter of fact, the aforementioned screen may be configured to allow the user to input a value of X which is greater than 0 and smaller than 1 as the weighting factor for the mass-resolving power, while 1−X is automatically set as the value for the ion detection sensitivity.

The user sets a previously specified standard sample and issues a command to initiate the measurement. The measurement controller 43 reads the default value of the voltage from the storage section 41 for each of the electrodes forming the OA-TOF-MS 1 and conducts the measurement with the read voltages applied to the related electrodes. In this measurement, a standard sample containing a predetermined amount of standard substance is continuously introduced into the ESI probe 201. The thereby generated ions are made to fly in a predetermined flight path defined by the voltages applied to the related electrodes inclusive of the orthogonal acceleration electrode 242. Each ion which has completed its flight through the flight path is individually detected, and mass spectrum data are obtained. Subsequently, the mass peak of a known ion having a predetermined mass-to-charge ratio is located from the acquired mass spectrum data. The intensity of the located mass peak of the known ion is determined from the height or area of the same mass peak. The mass-resolving power is determined from the mass-to-charge-ratio value and the peak width of the known ion.

After the mass spectrum data have been calculated for the default values, the measurement controller 43 sets a plurality of measurement conditions which differ from each other in the value of the voltage applied to at least one of the electrodes located within the range from the ESI probe 201 to the ion lens 241, with the value of the voltage applied to the electrode gradually changed in predetermined steps (e.g., 5% of the default value). Under each of these conditions, the measurement controller 43 acquires a set of mass spectrum data by conducting a measurement in the previously described manner to detect an ion having a predetermined mass-to-charge ratio generated from the standard substance in the standard sample. The reason why the values of the voltages applied to the electrodes located within the range from the ESI probe 201 to the ion lens 241 is initially tuned is that a slight change in the values of the voltages applied to these electrodes does not cause a significant loss of the ions.

If all ions generated in the ionization chamber 20 would always be detected by the ion detector 245 under any measurement condition, the mass peak in the mass spectrum data would always have the same area, and the mass peak would have the smallest width when the peak is highest. That is to say, both the highest measurement intensity and the highest mass-resolving power would be obtained. However, as described earlier, when one or more of the values of the voltages applied to the orthogonal acceleration electrode 242 and the second acceleration electrode 243 are changed, a considerable amount of ions may possibly be lost, which causes a considerable fluctuation of the measurement sensitivity and/or mass-resolving power for the ions. Furthermore, changing any one of the values of the voltages applied to these electrodes may also cause a change in the flight path of the ions after the acceleration by the second acceleration electrode 243. Therefore, in the present embodiment, the values of the voltages applied to the electrodes located within the range from the ESI probe 201 to the ion lens 241 are initially tuned to determine the values of the voltages applied to these electrodes, and the values of the voltages applied to the electrodes in the analysis chamber 24 are subsequently tuned.

After the mass spectrum data have been acquired for each of the measurement conditions, the intensity of the mass peak of the known ion and mass-resolving power in each set of mass spectrum data are determined. Next, the score value calculator 44 normalizes the intensity value of the mass peak in each set of mass spectrum data, using the intensity value of the highest mass peak among all sets of mass spectrum data as the reference. By this operation, the value I in equation (1) mentioned earlier is calculated. A similar operation is also performed for the mass-resolving power; the value of the mass-resolving power in each set of mass spectrum data is normalized, using the highest value of the mass-resolving power among all sets of mass spectrum data as the reference. By substituting the calculated intensity value I and the mass-resolving-power value R of the mass peak into equation (1), the score value under each measurement condition is determined. Then, based on the measurement condition having the highest score value, the value of the voltage applied to each of the electrodes located within the range from the ESI probe 201 to the ion lens 241 is determined.

Next, the values of the voltages applied to the reflectron 244, flight tube 246 and back plate 247 located within the analysis chamber 24 are tuned. As for the electrodes located within the range from the ESI probe 201 to the ion lens 241, the voltages determined in the previously described manner are applied, while the default voltages are applied to the orthogonal acceleration electrode 242 and the second acceleration electrode 243. A plurality of measurement conditions which differ from each other in the combination of the values of the voltages applied to the reflectron 244, flight tube 246 and back plate 247 are set, and a set of mass spectrum data is acquired under each measurement condition. Subsequently, the intensity of the mass peak of the ion having the predetermined mass-to-charge ratio mentioned earlier and mass-resolving power are determined from each set of mass spectrum data. Then, the score value calculator 44 normalizes the intensity value of each mass peak and mass-resolving power as well as calculates the score value in a similar manner to the previously described method. Ultimately, based on the measurement condition having the highest score value, the values of the voltages to be applied to the reflectron 244, flight tube 246 and back plate 247 are determined.

These electrodes located within the analysis chamber 24 are electrodes which define the returning flight path of the ions. The voltages applied to the reflectron 244 and the back plate 247 are related to the elevation of the potential gradient in the returning flight path. The altitude of the potential gradient in the returning flight path is a factor that affects the penetration depth of the ions. A slight change in this potential gradient is unlikely to cause a loss of ions. The flight tube 246 is an element for forming an effectively field-free space, and the value of the voltage applied to this element does not also seem to cause a loss of ions. Therefore, the values of the voltages applied to these electrodes are tuned before the tuning of the values of the voltages applied to the orthogonal acceleration electrode 242 and the second acceleration electrode 243. Once again, as in the previous case, the normalized intensity value of the mass peak I and the normalized mass-resolving-power value R are calculated for each set of mass spectrum data acquired under each of the measurement conditions, and the score value is calculated by equation (1). Then, based on the measurement condition having the highest score value, the values of the voltages to be applied to the reflectron 244, flight tube 246 and back plate 247 are determined.

Subsequently, as in the previous cases, a plurality of measurement conditions which differ from each other in the combination of the values of the voltages applied to the orthogonal acceleration electrode 242 and the second acceleration electrode 243 are set, and a set of mass spectrum data is acquired under each measurement condition. Then, the intensity of the mass peak of the ion having the predetermined mass-to-charge ratio mentioned earlier and mass-resolving power are determined from each set of mass spectrum data. Subsequently, the score value calculator 44 normalizes the intensity of each mass peak value and mass-resolving power as well as calculates the score value in a similar manner to the previously described method. Ultimately, based on the measurement condition having the highest score value, the values of the voltages to be applied to the orthogonal acceleration electrode 242 and the second acceleration electrode 243 are determined.

With the previously described process, the tuning of the voltages applied to the electrodes forming the OA-TOF-MS 1 comes to a nominal finish. However, as noted earlier, changing the value of any one of the voltages applied to the orthogonal acceleration electrode 242 and the second acceleration electrode 243 causes a change in the flight path of the ions. Therefore, the already tuned values of the voltages applied to the reflectron 244, flight tube 246 and back plate 247 may possibly be no longer optimal. Accordingly, it is preferable to once more tune the values of the voltages applied to these electrodes.

Accordingly, for each of the values of the voltages applied to the reflectron 244, flight tube 246 and back plate 247, a plurality of voltage values are once more set in predetermined steps (e.g., 3% of the previously determined voltage value) around the previously determined voltage value. A plurality of measurement conditions which differ from each other in the combination of the values of the voltages applied to the reflectron 244, flight tube 246 and back plate 247 are set. A measurement condition which gives the highest score value is once more identified in the previously described manner, to determine the values of the voltages applied to the reflectron 244, flight tube 246 and back plate 247.

In the OA-TOF-MS 1 according to the present embodiment, the value of the voltage applied to each electrode is tuned by performing the previously described processes. By this tuning task, an optimum combination of the applied voltages can be determined which satisfy the tuning condition in which the detection sensitivity and mass-resolving power for the ions are weighted by the user at will.

An example in which the voltage applied to the second acceleration electrode 243 was actually tuned is hereinafter described.

Figure 6:
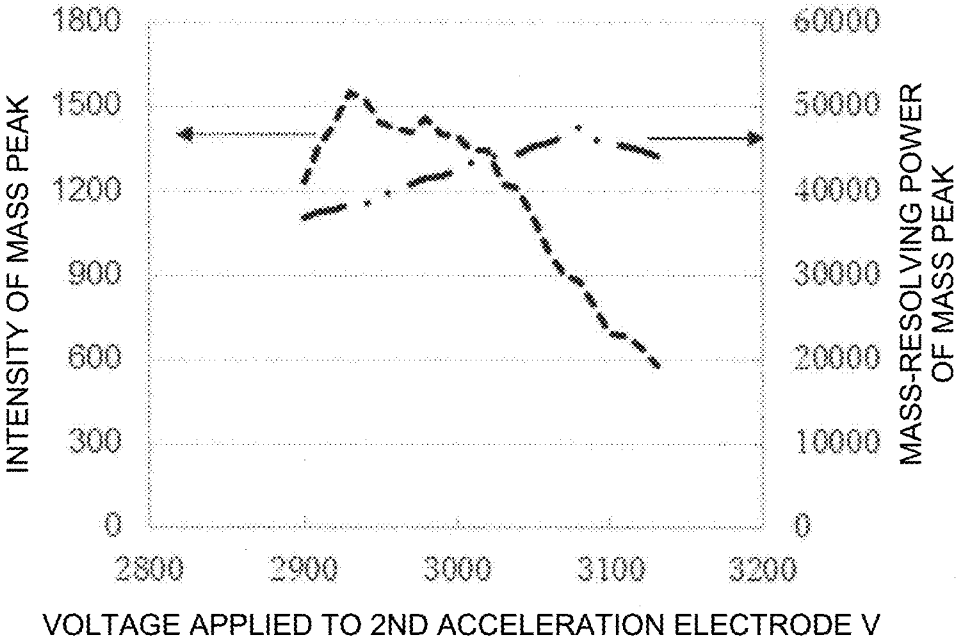
FIG. 6 is a graph showing the measured values of the intensity of the mass peak and the mass-resolving power with respect to the voltage applied to the second acceleration electrode.

FIG. 6 is a graph showing the result of a measurement in which mass spectrum data were acquired under each of the measurement conditions which differed from each other in the voltage applied to the second acceleration electrode 243, and the intensity of the mass peak of an ion having a predetermined mass-to-charge ratio and mass-resolving power were determined. In the example shown in FIG. 6, there is a certain difference between the value of the applied voltage which gives the highest intensity of the mass peak and that of the applied voltage which gives the highest mass-resolving power.

Figure 7:
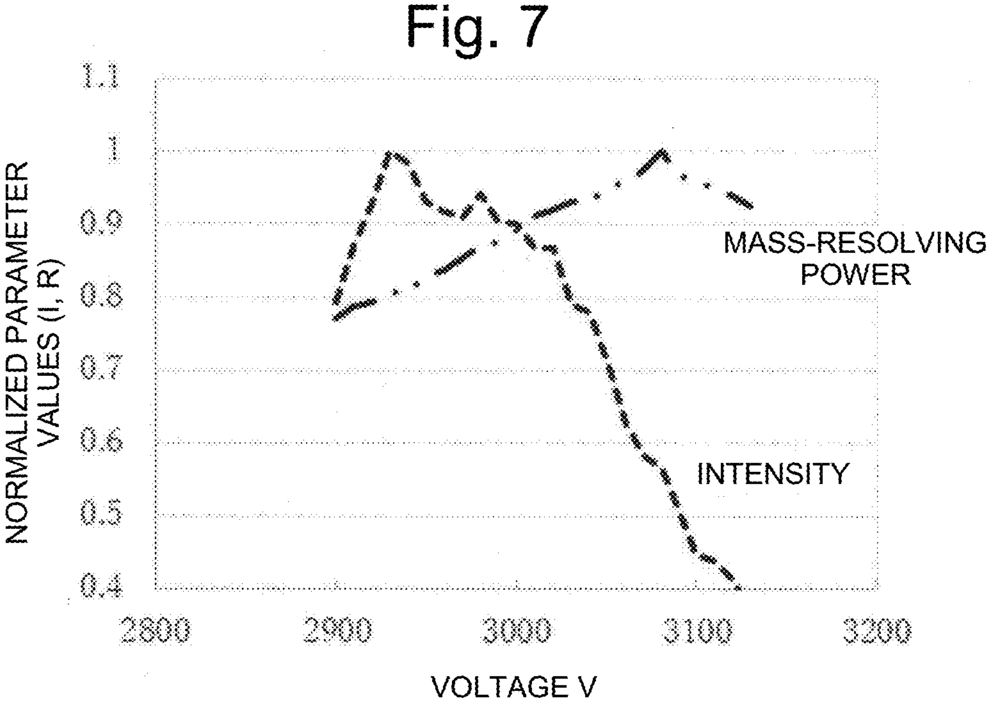
FIG. 7 is a graph showing the normalized values of the intensity of the mass peak and the mass-resolving power with respect to the voltage applied to the second acceleration electrode.

To solve this problem, as shown in FIG. 7, the intensity of the mass peak and mass-resolving power in each set of mass spectrum data are normalized, using the value of the highest intensity and that of the highest mass-resolving power obtained from the plurality of sets of mass spectrum data as the references, respectively. It should be noted that the normalized values I and R are described as "normalized parameters" in FIG. 7.

Figure 8:
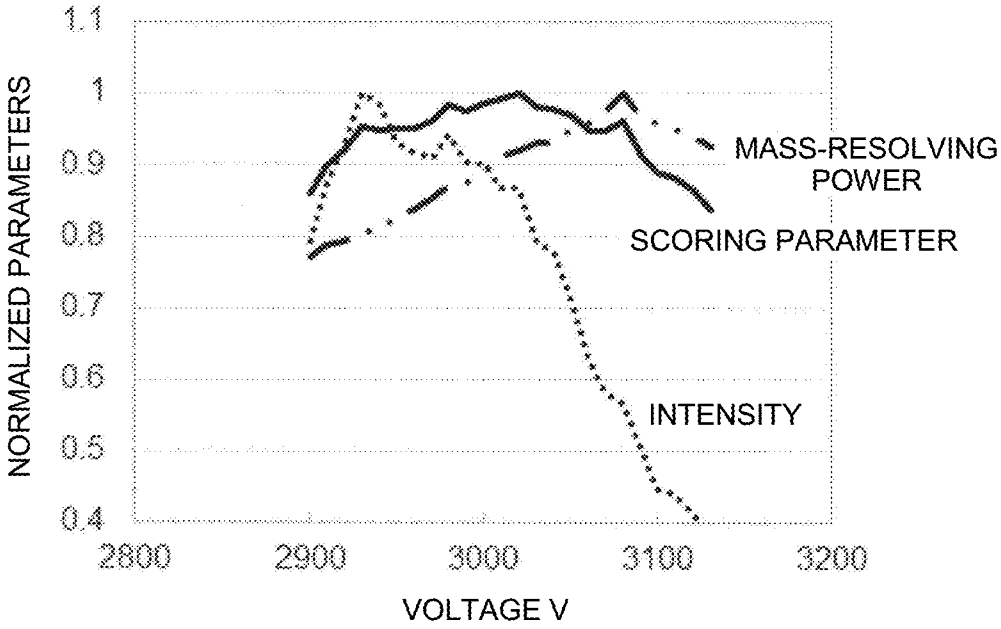
FIG. 8 is a graph showing the relationship between the voltage applied to the second acceleration electrode and the score value determined according to the present embodiment.

Using equation (1) including the weighting factors set by the user, the score value is calculated. FIG. 8 is a graph of the score value (scoring parameter) plotted against the voltage, using a value of 0.3 as the factor X for the normalized value I of the intensity of the mass peak, and 0.7 as the factor of $1-X$ for the normalized value R of the mass-resolving power. By calculating the score value in this manner and determining the applied voltage which maximizes the score value, it is possible to determine an optimum voltage for achieving a balance between the ion detection intensity and the mass-resolving power as desired by the user. It should be noted that the normalized values I and R as well as the score value Z are described as "normalized parameters" in FIG. 8.

The previous embodiment is a mere example and can be appropriately changed along the gist of the present invention.

In the previous embodiment, the tuning of the voltages applied to the electrodes was sequentially performed for three groups of electrodes, with one group including the electrodes located within the range from the ESI probe 201 to the ion lens 241, one group including the reflectron 244, flight tube 246 and the back plate 247, and one group including the orthogonal acceleration electrode 242 and the second acceleration electrode 243, followed by an additional process in which the values of the voltages applied to the reflectron 244, flight tube 246 and the back plate 247 were once more tuned. The combination of the electrodes in one group of electrodes can be appropriately changed. For example, the orthogonal acceleration electrode 242 and the second acceleration electrode 243 may be handled as separate groups and be individually subjected to the process of tuning the applied voltages.

In the previous embodiment, the score value was calculated for all of the three groups of electrodes, using equation (1). However, as in the case of the electrodes located within the range from the ESI probe 201 to the ion lens 241, if a variation in the voltage applied to an electrode is unlikely to cause a loss of ions, it may be possible to perform the tuning so as to optimize one of the ion detection sensitivity (intensity of the mass peak) and the mass-resolving power.

In the previous embodiment, the intensity of the highest mass peak and the highest mass-resolving power among all sets of mass spectrum data were used as the references for the normalization of the intensity of each mass peak and mass-resolving power in each set of mass spectrum data. A normalization using previously set reference values is also possible. In that case, the score value can be calculated every time one set of mass spectrum data has been acquired.

Although the ESI probe 201 was used as the ion source in the previous embodiment, a different type of ion source may also be provided. The measurement target does not need to be a liquid sample; it may also be a gas or solid sample. Furthermore, in the OA-TOF-MS 1 according to the previous embodiment, while it is essential to provide the analysis chamber 24 with the orthogonal acceleration electrode 242 as well as the electrodes for defining the flight path of the ions whose flight direction has been deflected by the orthogonal acceleration electrode 242, the other electrodes as well as the related components can appropriately be changed or modified.

[Modes]

It is evident for a person skilled in the art that the previously described illustrative embodiments are specific examples of the following modes of the present invention.

(Clause 1)

An orthogonal acceleration time-of-flight mass spectrometer according to one mode of the present invention includes:

- an ion source;
- an orthogonal acceleration electrode configured to deflect the flight direction of ions incident from the ion source;
- a flight-path-defining electrode configured to define a flight path of the ions deflected by the orthogonal acceleration electrode;
- an ion detection section configured to detect an ion after the flight of the ion through the flight path is completed;
- a voltage application section configured to apply a voltage to the orthogonal acceleration electrode and a voltage to the flight-path-defining electrode;
- a measurement control section configured to acquire mass spectrum data by conducting a measurement of a predetermined kind of known ion generated from a predetermined amount of known sample, under a plurality of measurement conditions which differ from each other in the value of the voltage applied from the voltage application section to the orthogonal acceleration electrode; and
- a score-value calculation section configured to calculate a score value based on a predetermined calculation formula, using the intensity of a mass peak and the mass-resolving power in the mass spectrum data acquired under each of the plurality of measurement conditions.

(Clause 6)

A tuning method for an orthogonal acceleration time-of-flight mass spectrometer according to one mode of the present invention includes the steps of:

- generating a predetermined kind of known ion from a sample by an ion source;
- deflecting the flight direction of ions incident from the ion source by applying a voltage to an orthogonal acceleration electrode, so as to cause the ions to fly in a flight path defined by a flight-path-defining electrode;
- acquiring mass spectrum data by detecting ions separated from each other by mass while flying in the flight path; and
- calculating a score value based on a predetermined calculation formula, using the intensity of a mass peak of the known ion and the mass-resolving power in the mass spectrum data,
- where:
- the score value is calculated for each of a plurality of measurement conditions which differ from each other in the value of the voltage applied to the orthogonal acceleration electrode; and
- the value of the voltage to be applied to the orthogonal acceleration electrode is determined based on the score value calculated for each of the plurality of measurement conditions.

The orthogonal acceleration time-of-flight mass spectrometer according to Clause 1 includes: an ion source; an orthogonal acceleration electrode configured to deflect the flight direction of ions incident from the ion source; a flight-path-defining electrode configured to define a flight path of the ions deflected by the orthogonal acceleration electrode; and an ion detection section configured to detect an ion after the flight of the ion through the flight path is completed. The tuning method for an orthogonal acceleration time-of-flight mass spectrometer according to Clause 6 is intended for the tuning of the aforementioned type of orthogonal acceleration time-of-flight mass spectrometer. The orthogonal acceleration electrode includes, for example, a push-out electrode located on the opposite side from the flight space across the central axis of the flight path of the ions incident from the ion source, and a pulling electrode located on the same side as the flight space. The flight-path-defining electrode includes, for example, a flight tube arranged on the peripheral area of the flight space. In the case of a reflectron mass spectrometer, for example, the reflectron for forming the returning flight path of the ions are also included in the flight-path-defining electrode.

If the same amount of ions are generated in the ion source and completely detected in the ion detection section, the mass peak in the mass spectrum data will always have the same area, and the peak width of the mass peak will be narrowest when the mass peak is highest. That is to say, both the highest measurement intensity and the highest mass-resolving power will be obtained. However, in the orthogonal acceleration time-of-flight mass spectrometer, an unfavorable situation may possibly occur; for example, when the value of the voltage applied to the orthogonal acceleration electrode is changed in order to increase the mass-resolving power, some of the ions which have entered the orthogonal acceleration electrode will no longer be introduced into the flight space, and vice versa. Therefore, even when the same amount of ions are generated by the ion source, the amount of ions which ultimately reach the ion detector can significantly change depending on the value of the voltage applied to the orthogonal acceleration electrode. Accordingly, it is most likely that there have been cases in which an orthogonal acceleration time-of-flight mass spectrometer shows a low level of mass-resolving power when the values of the measurement parameters are optimized so as to maximize the measurement sensitivity for the ions, while the same device shows a low level of measurement sensitivity when the values of the measurement parameters are optimized so as to maximize the mass-resolving power for the ions.

In the orthogonal acceleration time-of-flight mass spectrometer according to Clause 1 and the tuning method according to Clause 6, mass spectrum data are acquired by a measurement of a predetermined kind of known ion generated from a predetermined amount of known sample, under a plurality of measurement conditions which differ from each other in the value of the voltage applied to the orthogonal acceleration electrode. A score value is calculated based on a predetermined computation formula, using the intensity of a mass peak and the mass-resolving power in the mass spectrum data acquired under each of the plurality of measurement conditions. Thus, in the orthogonal acceleration time-of-flight mass spectrometer according to Clause 1 and the tuning method according to Clause 6, since both the intensity of the known ion and the mass-resolving power are considered in the calculation of the score value, both a high level of measurement sensitivity and a high level of mass-resolving power can be achieved by using the calculated score value as a basis for determining the values of the voltages to be applied to the orthogonal acceleration electrode.

(Clause 2)

In the orthogonal acceleration time-of-flight mass spectrometer according to Clause 2, which is one mode of the orthogonal acceleration time-of-flight mass spectrometer according to Clause 1, the voltage application section applies, to the orthogonal acceleration electrode, a pulse voltage which deflects the flight direction of the ions in a predetermined cycle of time, as well as a standby voltage during other periods of time, and the measurement control section acquires the mass spectrum data under a plurality of measurement conditions which differ from each other in the value of the standby voltage.

In the orthogonal acceleration time-of-flight mass spectrometer according to Clause 2, the mass-resolving power can be improved by tuning the value of the standby voltage.

(Clause 3)

In the orthogonal acceleration time-of-flight mass spectrometer according to Clause 3, which is one mode of the orthogonal acceleration time-of-flight mass spectrometer according to Clause 1 or 2, the measurement control section acquires mass spectrum data by performing a measurement of the known ion under a plurality of measurement conditions which differ from each other in the value of the voltage applied to the flight-path-defining electrode.

In the orthogonal acceleration time-of-flight mass spectrometer according to Clause 3, even when a flight path has changed depending on the value of the voltage applied to the orthogonal acceleration electrode, a suitable voltage for the flight path after the change can be applied to the flight-path-defining electrode.

(Clause 4)

The orthogonal acceleration time-of-flight mass spectrometer according to Clause 4, which is one mode of the orthogonal acceleration time-of-flight mass spectrometer according to Clauses 1-3, further includes a tuning condition setting section configured to receive an input of a factor for the intensity of the mass peak and a factor for the mass-resolving power, and the score-value calculation section calculates the score value as the sum of a value obtained by multiplying an intensity parameter value calculated from the intensity of the mass peak by the factor for the intensity of the mass peak and a value obtained by multiplying a resolving-power parameter value calculated from the mass-resolving power by the factor for the mass-resolving power.

The orthogonal acceleration time-of-flight mass spectrometer according to Clause 4 allows users to adjust the balance between the ion detection intensity and the mass-resolving power at will.

(Clause 5)

The orthogonal acceleration time-of-flight mass spectrometer according to Clause 5, which is one mode of the orthogonal acceleration time-of-flight mass spectrometer according to Clause 4, the intensity parameter value is a value normalized with reference to the value of the intensity of the largest mass peak among the mass spectrum data acquired under the plurality of measurement conditions, and the resolving-power parameter value is a value normalized with reference to the value of the highest mass-resolving power among the mass spectrum data acquired under the plurality of measurement conditions.

The orthogonal acceleration time-of-flight mass spectrometer according to Clause 5 can calculate a score value in which the measured value of the intensity of an actually measured mass peak and the value of the mass-resolving power are appropriately reflected.

REFERENCE SIGNS LIST

- 1 . . . Orthogonal Acceleration Time-of-Flight Mass Spectrometer
- 2 . . . Mass Spectrometry Unit
- 20 . . . Ionization Chamber
- 201 . . . ESI Probe
- 202 . . . Desolvation Tube
- 21 . . . First Intermediate Vacuum Chamber
- 211 . . . Ion Guide
- 212 Skimmer
- 22 . . . Second Intermediate Vacuum Chamber
- 221 . . . Ion Guide
- 23 . . . Third Intermediate Vacuum Chamber
- 231 . . . Quadrupole Mass Filter
- 232 . . . Collision Cell
- 233 . . . Muti-Pole Ion Guide
- 234 . . . Ion Guide
- 24 . . . Analysis Chamber
- 241 . . . Ion Lens
- 242 . . . Orthogonal Acceleration Electrode
- 2421 . . . Push-Out Electrode
- 2422 . . . Pulling Electrode
- 243 . . . Second Acceleration Electrode
- 244 . . . Reflectron
- 2441 . . . First Reflectron
- 2442 . . . Second Reflectron
- 245 . . . Ion Detector
- 246 . . . Flight Tube
- 247 . . . Back Plate
- 3 . . . Voltage Application Unit
- 4 . . . Control-and-Processing Unit
- 41 . . . Storage Section
- 42 . . . Tuning Condition Setter
- 43 . . . Measurement Controller
- 44 . . . Score Value Calculator
- 45 . . . Voltage Determiner
- 6 . . . Input Unit
- 7 . . . Display Unit
- C . . . Ion Beam Axis
- C' . . . Central Axis of Ions Actually Entering Orthogonal Acceleration Space

The invention claimed is:

1. An orthogonal acceleration time-of-flight mass spectrometer, comprising:

an ion source;

an orthogonal acceleration electrode configured to deflect a flight direction of ions incident from the ion source;

a flight-path-defining electrode configured to define a flight path of the ions deflected by the orthogonal acceleration electrode;

an ion detection section configured to detect an ion after a flight of the ion through the flight path is completed;

a voltage application section configured to apply a pulse voltage which deflects the flight direction of the ions in a predetermined cycle of time, as well as a standby voltage during other periods of time to the orthogonal acceleration electrode, and a voltage to the flight-path-defining electrode;

a measurement control section configured to acquire a plurality of mass spectrum data which are different in an intensity of a mass peak and a mass-resolving power in the mass spectrum data by conducting a measurement of a predetermined kind of known ion generated from a predetermined amount of known sample, under a plurality of measurement conditions which differ from each other in a value of the standby voltage applied from the voltage application section to the orthogonal acceleration electrode; and a score-value calculation section configured to calculate a score value based on a predetermined calculation formula, using the intensity of the mass peak and the mass-resolving power in the mass spectrum data acquired under each of the plurality of measurement conditions.

2. The orthogonal acceleration time-of-flight mass spectrometer according to claim 1, wherein the measurement control section acquires mass spectrum data by performing a measurement of the known ion under a plurality of measurement conditions which differ from each other in a value of the voltage applied to the flight-path-defining electrode.

3. The orthogonal acceleration time-of-flight mass spectrometer according to claim 1, further comprising a tuning condition setting section configured to receive an input of a factor for the intensity of the mass peak and a factor for the mass-resolving power, wherein the score-value calculation section calculates the score value as a sum of a value obtained by multiplying an intensity parameter value calculated from the intensity of the mass peak by the factor for the intensity of the mass peak and a value obtained by multiplying a resolving-power parameter value calculated from the mass-resolving power by the factor for the mass-resolving power.

4. The orthogonal acceleration time-of-flight mass spectrometer according to claim 3, wherein the intensity parameter value is a value normalized with reference to the value of the intensity of a largest mass peak among the mass spectrum data acquired under the plurality of measurement conditions, and the resolving-power parameter value is a value normalized with reference to the value of a highest mass-resolving power among the mass spectrum data acquired under the plurality of measurement conditions.

5. A tuning method for an orthogonal acceleration time-of-flight mass spectrometer, comprising steps of:

generating a predetermined kind of known ion from a sample by an ion source;

deflecting a flight direction of ions incident from the ion source by applying, to an orthogonal acceleration electrode:

a pulse voltage during a predetermined cycle of time, so as to cause the ions to fly in a flight path defined by a flight-path-defining electrode; and a standby voltage during other periods of time;

acquiring a plurality of mass spectrum data which are different in an intensity of a mass peak and a mass-resolving power in the mass spectrum data by detecting, under a plurality of measurement conditions which differ from each other in a value of the standby voltage, ions separated from each other by mass while flying in the flight path; and calculating a score value based on a predetermined calculation formula, using the intensity of the mass peak of the known ion and the mass-resolving power in the mass spectrum data, where:

the score value is calculated for each of the plurality of measurement conditions; and the value of the standby voltage to be applied to the orthogonal acceleration electrode is determined based on the score value calculated for each of the plurality of measurement conditions.

6. The orthogonal acceleration time-of-flight mass spectrometer according to claim 1, wherein the plurality of measurement conditions constitutes a first plurality of measurement conditions, and wherein the measurement control section is further configured to acquire mass spectrum data by conducting a measurement of the predetermined kind of known ion generated from a predetermined amount of known sample, sequentially:

under a second plurality of measurement conditions which differ from each other in a value of the pulse voltage applied from the voltage application section to the flight-path-defining electrode, and under the first plurality of measurement conditions which differ from each other in a value of the pulse voltage applied from the voltage application section to the orthogonal acceleration electrode.

7. The orthogonal acceleration time-of-flight mass spectrometer according to claim 6, wherein, after the acquiring mass spectrum data under the first plurality of measurement conditions, the measurement control section is further configured to acquire mass spectrum data by conducting a measurement of the predetermined kind of known ion generated from a predetermined amount of known sample under a third plurality of measurement conditions which differ from each other in a value of the pulse voltage applied from the voltage application section to the flight-path-defining electrode.

8. The orthogonal acceleration time-of-flight mass spectrometer according to claim 1, wherein the plurality of the measurement conditions include a measurement condition in which the standby voltage is set such that at least a portion of ions, among the ions incident on the orthogonal acceleration electrode, having a flight component in an opposite direction to a direction in which the ions are deflected by the orthogonal acceleration electrode, are eliminated by colliding with the orthogonal acceleration electrode.

* * * * *